(12) United States Patent
Whitehill

(10) Patent No.: US 6,966,275 B2
(45) Date of Patent: Nov. 22, 2005

(54) PET BED

(76) Inventor: David C. E. Whitehill, 1716 El Camino Del Teatro, La Jolla, CA (US) 92037

(*) Notice: Subject to any disclaimer, the term of this patent is extended or adjusted under 35 U.S.C. 154(b) by 145 days.

(21) Appl. No.: 10/118,720

(22) Filed: Apr. 8, 2002

(65) Prior Publication Data
US 2003/0066489 A1 Apr. 10, 2003

Related U.S. Application Data

(60) Provisional application No. 60/328,518, filed on Oct. 10, 2001.

(51) Int. Cl.$^7$ .................... A01K 29/00; A47C 27/10
(52) U.S. Cl. ................................ 119/28.5; 5/710
(58) Field of Search ..................... 119/28.5; 5/710, 5/112, 413 AM, 706, 499, 643, 644, 654, 655.3

(56) References Cited

U.S. PATENT DOCUMENTS

| | | | |
|---|---|---|---|
| 1,569,710 A | 1/1926 | Burt | 119/285 |
| 2,032,248 A | 2/1936 | Bins | 119/28.5 |
| 3,147,496 A * | 9/1964 | Mendoza | 5/706 |
| D216,400 S | 12/1969 | Schwertley | D30/41 |
| 3,533,376 A * | 10/1970 | Smith | 119/28.5 |
| 3,902,456 A | 9/1975 | David | 119/28.5 |
| D239,395 S | 3/1976 | David | D30/41 |
| 4,332,214 A | 6/1982 | Cunningham | 119/28.5 |
| 4,459,714 A * | 7/1984 | Lin | 5/710 |
| 4,729,343 A | 3/1988 | Evans | 119/28.5 |
| D309,199 S | 7/1990 | McMahon | D30/118 |
| 5,010,843 A * | 4/1991 | Henry | 119/28.5 |
| 5,311,837 A * | 5/1994 | Mamer-Boellstorff | 119/28.5 |
| D366,085 S | 1/1996 | Millington et al. | D21/242 |
| 5,588,393 A | 12/1996 | Heilborn | 119/28.5 |
| 5,598,593 A * | 2/1997 | Wolfe | 5/710 |
| 5,662,065 A | 9/1997 | Bandimere et al. | 119/28.5 |
| D386,832 S | 11/1997 | McAlister | D30/118 |
| 5,685,257 A | 11/1997 | Feibus | 119/28.5 |
| 5,911,193 A | 6/1999 | Johnson | 119/28.5 |
| 6,024,046 A | 2/2000 | Geiger et al. | 119/28.5 |
| 6,145,142 A * | 11/2000 | Rechin et al. | 5/706 |
| 6,209,486 B1 | 4/2001 | Reynolds | 119/28.5 |
| 6,305,317 B1 * | 10/2001 | Spiegel | 119/28.5 |

FOREIGN PATENT DOCUMENTS

| | | | | |
|---|---|---|---|---|
| AU | 85/00079 | * | 4/1985 | 119/28.5 |
| GB | 2175802 A | * | 5/1985 | 119/28.5 |
| GB | 2 175 802 | | 12/1986 | |
| GB | 97/01814 | * | 7/1997 | 119/28.5 |
| WO | WO 98/01024 | | 1/1998 | |

* cited by examiner

Primary Examiner—Teri P. Luu
Assistant Examiner—Elizabeth Shaw
(74) Attorney, Agent, or Firm—Morrison & Foerster LLP

(57) ABSTRACT

An inflatable bed designed for pets is described which bed comprises at least one, preferably at least two, separately inflatable members wherein said member or members is/are arranged so that when inflated the bed forms a concavity at the center at least when occupied by an animal and wherein said center may optionally contain a drainage hole extending through the body of the bed.

29 Claims, 8 Drawing Sheets

Bottom View

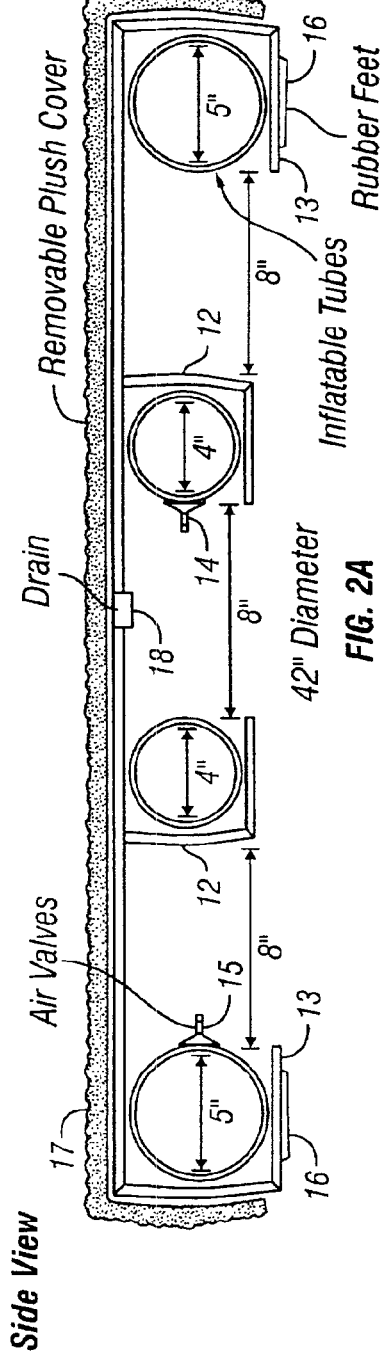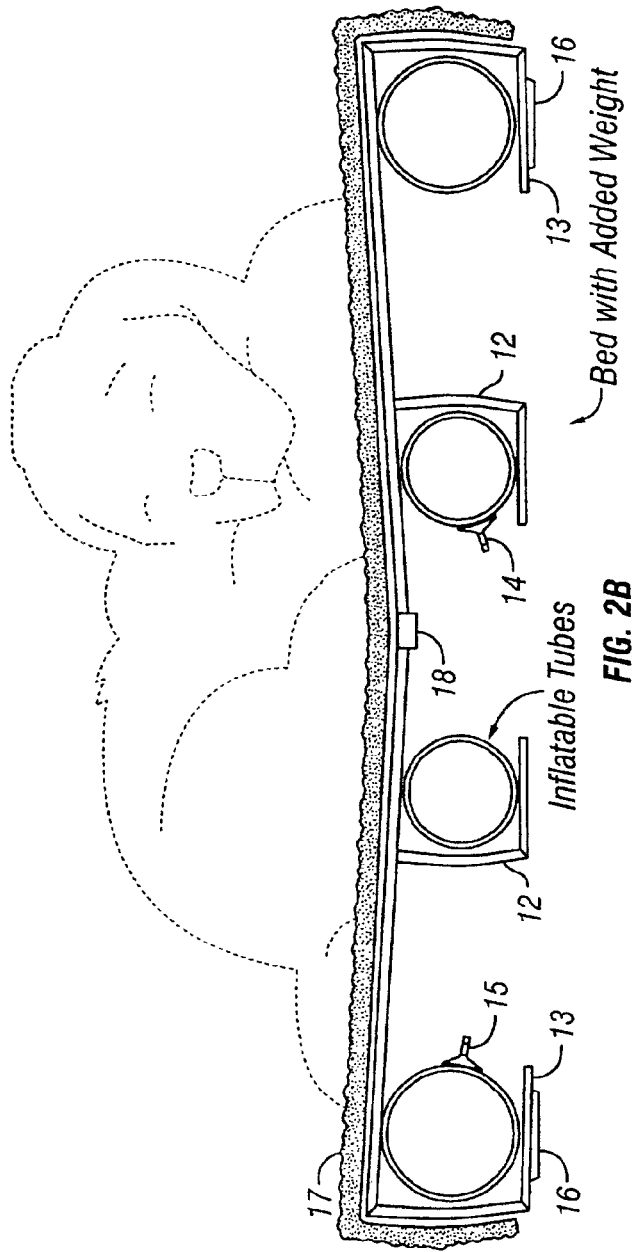

PET BED

CROSS-REFERENCE TO RELATED APPLICATIONS

This Application claims benefit under 35 U.S.C. §119(e) of provisional application No. 60/328,518 filed 10 Oct. 2001. The contents of this document are incorporated herein by reference.

TECHNICAL FIELD

The invention relates to accessories for pets such as dogs and cats. More particularly, it relates to inflatable beds which are inherently concave, which may contain drainage holes at the center, and which support removable, washable coverings.

BACKGROUND OF THE INVENTION

When pets are provided with sleeping arrangements that are improperly designed, the results are often troublesome. Pets have a natural tendency to manipulate their sleeping area to create a nest and in the process often both soil and destroy the beds provided for them. There have been a number of attempts to provide desirable accommodations, but none has been completely satisfactory.

A number of designs, generally disclosing pillows or pet beds which are circular or oval in configuration have been described, for example, in Design Patents DES216,400; DES239,395; DES309,199; and DES386,832. These designs generally feature a depressed center surrounded by an elevated ridge, with or without an opening at one section of the ridge.

Additional features are described in, for example, U.S. Pat. No. 1,569,710 which describes a dog mat which is concave with an edge that is beveled to provide a head rest.

U.S. Pat. No. 2,032,248 describes a more complex stuffed mattress which has a specific design for receiving a bolster at the edge.

U.S. Pat. No. 3,902,456 describes a doughnut shaped pet bed with compressible filling in the pillow-like structure surrounding a flat center.

U.S. Pat. No. 4,332,214 discloses a bed with an integrated heating unit which includes a drainage system at one end through the heated portion.

U.S. Pat. No. 5,588,393 is directed to a collapsible pet bed which folds to form a flattened structure.

U.S. Pat. No. 5,662,065 describes a hollow pet bed with space below a top surface to permit insects to fall through into an interior space which is provided with an exterminating composition.

U.S. Pat. No. 5,685,257 describes a layered, assertedly hypo-allergenic and non-toxic, pet bed which contains absorbent and fill layers.

U.S. Pat. No. 5,911,193 describes a layered material for protecting animals from cold surfaces using a flexible pad which may optionally have a plurality of drainage holes distributed throughout.

U.S. Pat. No. 6,024,046 describes an impermeable foam bed which contains a hollowed portion in the center.

U.S. Pat. No. 6,209,486 describes a bed for incontinent animals where a sleeping pad is affixed to a frame and the sleeping pad is a non-absorbent open-weave material which permits urine to drain.

None of the disclosures above relate to inflatable beds. Other devices have been made in inflatable form, such as an exercise and play apparatus described in Design Patent DES366,085 and collapsible dog houses are described in U.S. Pat. No. 4,729,343.

Inflatable dog beds are commercially available in catalog sales. For example, hunting dog beds which are simple inflatable mattresses without further design features are advertised in Cabela's catalog for Fall of 1998. Air beds which can be deflated that contain a contiguous air bladder are described in Pet U.S.A.. L. L. Bean describes inflatable beds in various shapes with specialized cushion inserts in their 2001 catalog.

The present invention provides features unavailable in prior art pet beds by combining a multi-compartment concave inflatable design, the ability to include centralized drainage, and a removable, washable cover.

DISCLOSURE OF THE INVENTION

The present invention provides a superior inflatable bed which is sturdy enough to support a heavy animal, which may provide for centralized drainage, and which has a removable, washable cover. The bed has at least one, preferably at least two separate inflatable members, preferably a multiplicity of separate inflatable members, which may be isolated or interconnected. When the members are interconnected, they are preferably further supported by beams that frame the outline of the members. In all cases, the overall shape of the bed is concave at the center providing a nesting effect for the animal. At the center lowest point of the concavity is at-least one drainage hole which communicates with the exterior of the bed. In a preferred embodiment, at least the top surface of the bed is covered with a washable fabric which is removably attached, in some cases without fasteners, to the remainder of the bed and which preferably provides an opening concentric with the drainage hole at the center of the concavity.

Thus, in one aspect, the invention is directed to an inflatable bed designed for pets which comprises at least one inflatable member wherein said member is arranged so that when inflated and occupied by an animal the bed forms a concavity at the center and wherein said center preferably contains a drainage hole extending through the body of the bed. Preferably the top surface of the bed is detachably covered with a washable fabric preferably, but not necessarily containing an opening contiguous with the drainage hole.

In one set of preferred embodiments, the inflatable bed contains at least two separately inflatable members. Where only one, two or three inflatable members are included, these are typically arranged as concentric rings where the inflatable members are of decreasing diameter. Any arbitrary number of concentrically arranged inflatable tubular members can be employed as will be further described below.

In other preferred embodiments, the bed contains a multiplicity of radially arranged, separately inflatable members optionally interconnected to allow the passage of air between them.

BRIEF DESCRIPTION OF THE DRAWINGS

FIGS. 2A and 2B show cross-sectional views of the embodiment of FIG. 1.

MODES OF CARRYING OUT THE INVENTION

Figure 1A:
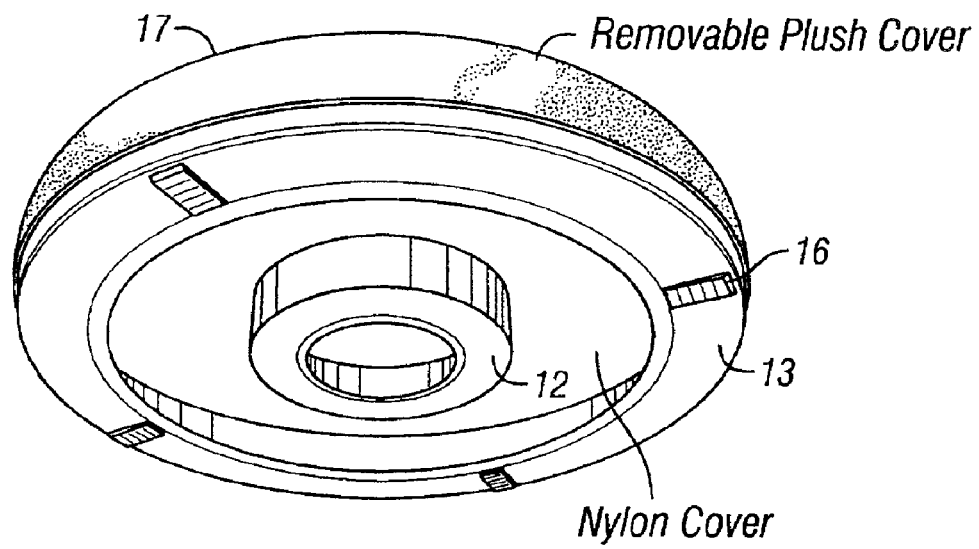
FIGS. 1A and 1B show a diagram of an embodiment containing two concentric inflatable tubes held in a flexible frame.

The invention is directed to beds designed to accommodate small animals such as cats and dogs. The beds of the invention are particularly attractive to dogs, including large dogs of 100 pounds or more. Of course, other animals, including humans, especially children may use the beds. The size and shape of the bed may be accommodated to the particular animal for which it is intended. The beds of the invention overcome the disadvantages of pet beds that are known in the art, such as lack of portability, lack of contoured nesting ability, inadequate support, low durability, difficulty in cleaning, infiltration with fleas, and retention of odors.

Because the beds of the invention are inflatable, they can readily be transported and re-inflated for use. When not in use, they can be easily stored. Especially where there are a multiplicity of inflatable members with appropriate supports, an adequate resistance to compression is provided so that the weight of the animal does not compress the surface except to the extent whereby a concavity is created. The smooth surface of the inflatable members and their immediate cover renders these non-penetrable by insects and provides good insulation. Any drainage opening at the concave center prevents odor absorption and accumulation of liquids. The removable top surface cover, which is washable, permits easy cleaning.

It is important that the design be such that adequate support is provided for the animal so that even arthritic or wounded animals are adequately supported in comfort. This can be accomplished by supplying a properly designed bed containing at least one inflatable member and preferably multiplicity of inflatable members in a configuration which permits even weight distribution. In preferred embodiments, the beds contain at least 2 inflatable members. Beds with a multiplicity of inflatable members may contain 3–10, preferably 3–8, more preferably 3–6 inflatable members.

It is also important that liquids not be allowed to accumulate in the bed, and this can be accomplished by a drainage hole at the concave center. It is equally important that the bed easily be cleaned and this is accomplished in preferred embodiments by a removable, washable cover which protects at least the top surface.

As will be described below, a number of designs are possible. In one general type of design, the concavity in the bed is created by the weight of the occupant in roughly the center of the bed. Thus, where an inflatable member is enclosed in a cover which extends across the top surface of the bed, and wherein the inflatable member creates a cavity at the center, the concavity at the surface is generated when an occupant is present. In addition, the cavity at the center may simply result from the interior limit of the inflatable member such as a circular tube. The center can then, if desired, be further covered at the bottom surface with padding or other resilient material. In view of the foregoing, by "concavity" is meant that when the bed is occupied the occupant of the bed is generally at a lower level than the outer rim thereof. The concavity may exist in both the presence and absence of an occupant, or may exist only in the occupant's presence.

Figure 1B:
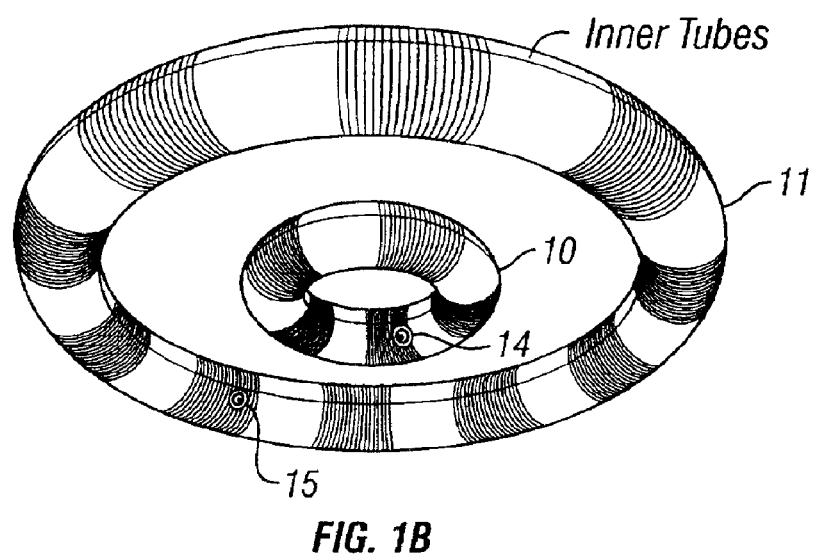

One exemplary design is shown in FIGS. 1A and 1B. In this design, two tire inner tubes are arranged concentrically. The innermost tube 10 is smaller in diameter than the outermost tube 11 shown in FIG. 1B. As shown in FIG. 1A, these tubes are held in place by flexible nylon covers 12 and 13, respectively, which fold over the inflatable members but leave accessible the valves 14 and 15. The nylon cover stretches over each tube as shown in FIG. 1A. Optionally, non-skid feet 16 can be attached to the cover. A removable plush cover 17 provides washability.

FIGS. 2A and 2B show a cross-sectional view of the embodiment of FIGS. 1A and 1B. As shown, the plush cover 17 covers the nylon bracketing material, portions of which were shown in FIG. 1A as numbers 12 and 13. The drain 18 is at the center top of the bracketing cover. FIG. 2B shows the same embodiment as FIG. 2A but as depressed by the weight of an animal. In the embodiment shown, the plush cover is sufficiently permeable that the drain hole can be accessed.

Figure 3:
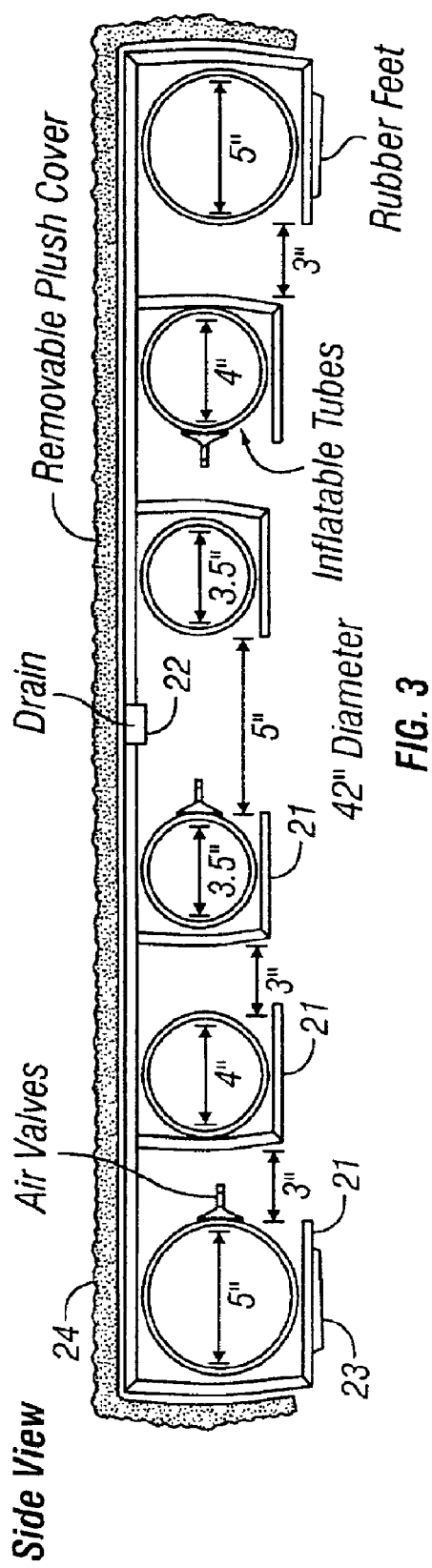
FIG. 3 shows a cross-sectional view of an embodiment similar to that of FIGS. 1 and 2, but containing three concentric tubes.

FIG. 3 shows a cross-section of an embodiment similar to that of FIGS. 1 and 2 but containing three concentric, inflatable members. As in the previous embodiments, the cover 21 holds the three concentric, inflatable members in place. A drain 22 is at the center of this cover which may optionally contain feet 23 and an optional, removable plush cover 24. Each inflatable member has a valve accessible for inflation.

It will be evident that in addition to the embodiments shown in FIGS. 1–3, a simpler form of the bed can be constructed using a single outer, inflatable ring—i.e., only tube 11 in FIG. 1 where tube 10 is not present and the covering 12 for ring 10 is not present either. A simplified construction involves a fabric cover similar to that shown as 13 in FIG. 1 covering a standard automobile tire inner tube or other sturdy, inflatable, rubber tube.

Figure 4:
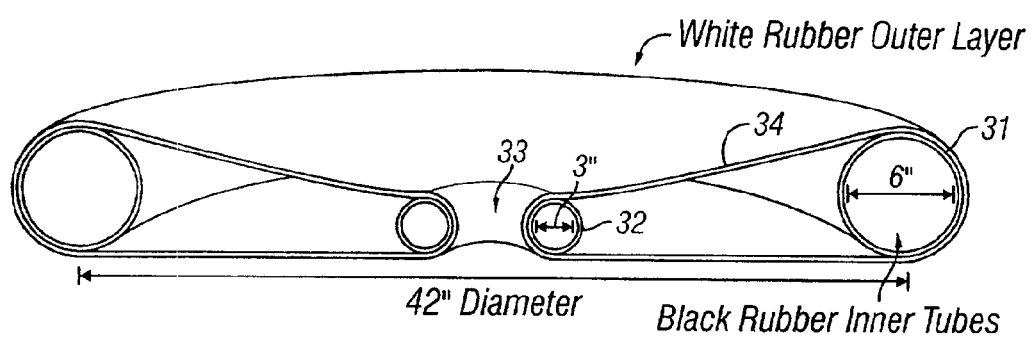
FIG. 4 is an alternative embodiment of a bed containing two concentric, inflatable members.

Another exemplary design is shown in cross-section in FIG. 4. In this design, two annular inflatable members 31 and 32 are disposed in concentric rings and contained in a circular fabric frame 34. The fabric frame may be rubber, vinyl, latex or any other sturdy fabric. Each inflatable member is supporting a surrounding fabric. The flat piece stretched over the top of the bed contains attached, e.g., sewn panels that cover one side and the bottom of the inflatable member. The inflatable members can be composed of standard inflatable materials such as rubber, latex, vinyl, and the like. Simple inner tubes could be used. Each inflatable member in this embodiment will have a valve accessible through the circular cover to permit inflation and deflation. The circular cover provides, as shown, a drainage hole at the concave center 33 to permit the escape of liquid. In use, the upper surface of the bed shown in cross-section in FIG. 4 may have affixed, in a removable fashion, for example, using Velcro™ attachment, a washable, smooth, but semi-absorbent cover made of suitable fabric. The cover will preferably contain an opening at the center to accommodate the drainage hole 33 shown in FIG. 4.

Figure 5:
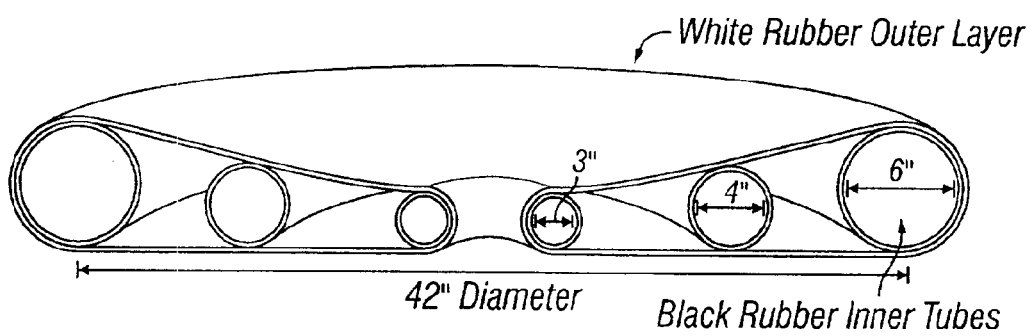
FIG. 5 is a cross-sectional view of an alternative embodiment which contains three separately inflatable members.

FIG. 5 shows an alternative construction which contains three independently inflatable members. The construction is similar to that shown in FIG. 4 except that three members rather than two of varying sizes are employed.

Figure 6:
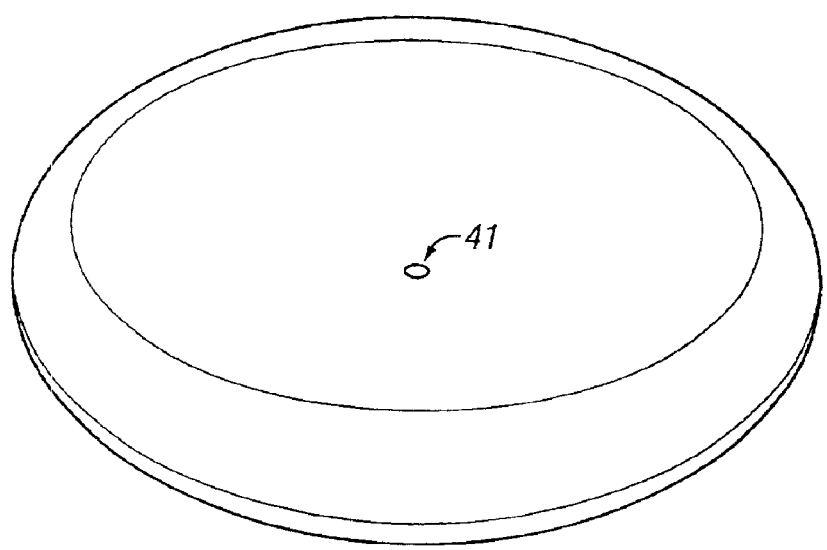
FIG. 6 is a view from the top of the bed shown in FIG. 5.

FIG. 6 shows a top view of the bed shown in cross-section in FIG. 5. As shown, the top surface is concave with a drainage hole 41 at the center. Again, in use, the top surface is preferably covered with a removable, washable fabric. The fabric can be wrapped around the sides of the bed as well.

Figure 7:
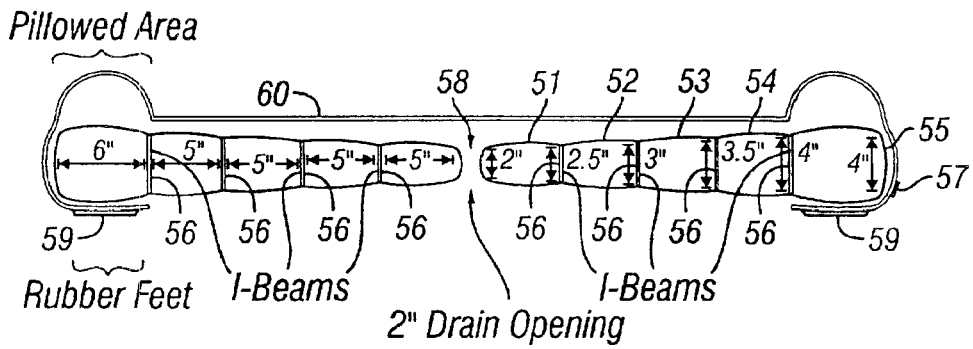
FIG. 7 is a cross-sectional view of an alternative construction where flat beams separate a multiplicity of inflatable annular members.

FIG. 7 shows an alternative construction in cross-section. In this construction, five concentric annular inflatable members of diminishing size toward the center of the ring are contiguous and separated by supports which become relatively flat beams when inflated. As shown in this embodiment, the separately inflatable members 51–55 are connected through small passages 56 to permit the flow of air from one chamber to the next and a single Schraeder™ valve 57 is attached to the outer member to permit inflation and deflation of the entire assembly. As shown, there is a two-inch drain opening 58 at the center. If desired, the assembly can be provided with feet 59 as shown. The assembly of inflatable members is covered with a fabric 60 where the fabric is stretched across the top and around the edges of the assembly of the inflatable members. The center of the fabric should be sufficiently permeable to access the drain opening 58.

Figure 8:
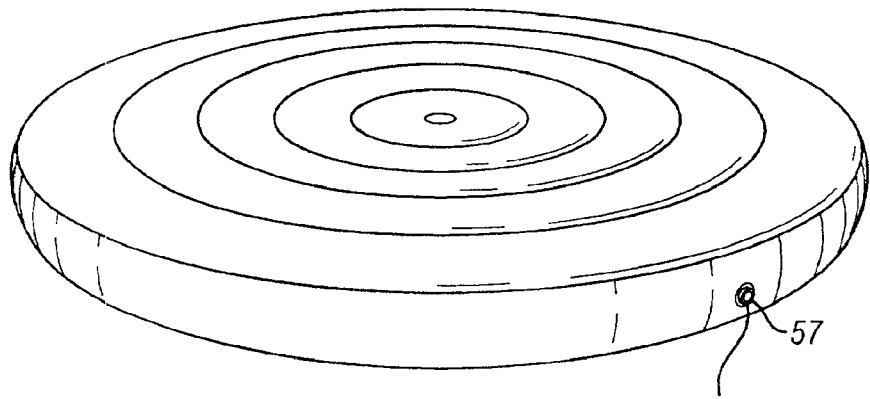
FIG. 8 is a top view of the bed of FIG. 7.

FIG. 8 shows a top view of the bed shown in FIG. 7. The concave nature of the upper surface will be manifested when the bed is occupied by the animal.

Figure 9:
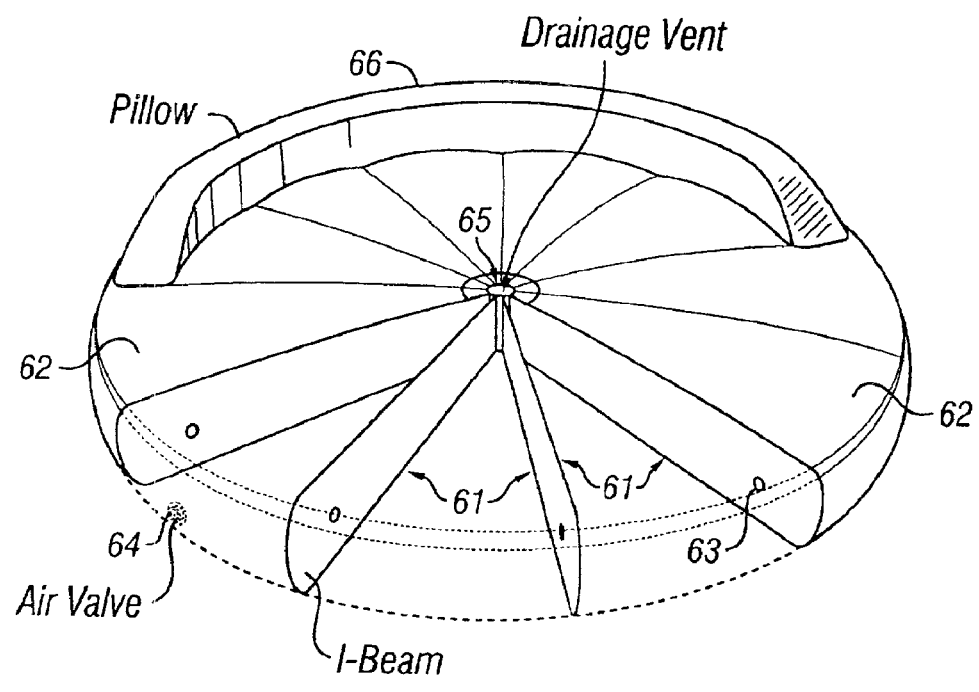
FIG. 9 shows an alternative construction wherein a multiplicity of inflatable members are separated by flat beams radially distributed.

FIG. 9 shows a cutaway view of an alternative construction which nevertheless accomplishes a potentially concave configuration. In the construct in FIG. 9, the inflatable members are arranged radially, and when inflated, relatively flat supports 61 are generated radially to separate the circular bed into separate compartments 62. Air passages 63 are present between the separate compartments to permit filling from a single air valve 64. A drainage hole 65 at the center is employed. The support beams 61 are tapered toward the center as shown to assure a concave shape. The drainage hole 65 remains at the center. The embodiment shown in FIG. 9 further contains an optional pillow 66 which is inflated either separately or through interconnection to the radial inflatable members.

Figure 10:
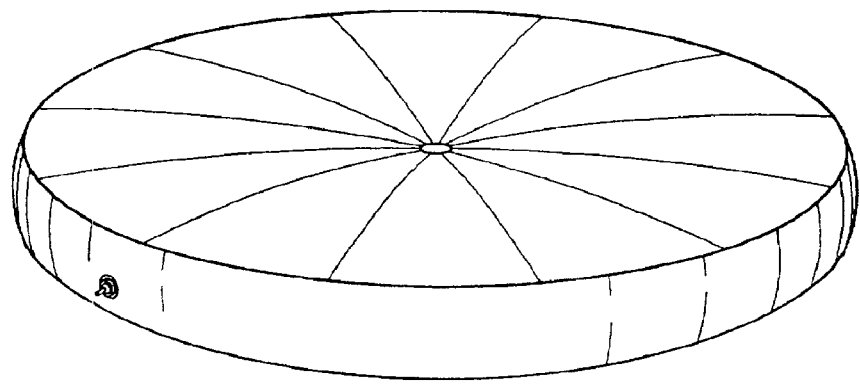
FIG. 10 shows a top view of the bed of FIG. 9 showing the drainage opening at the center.
Figure 11A:
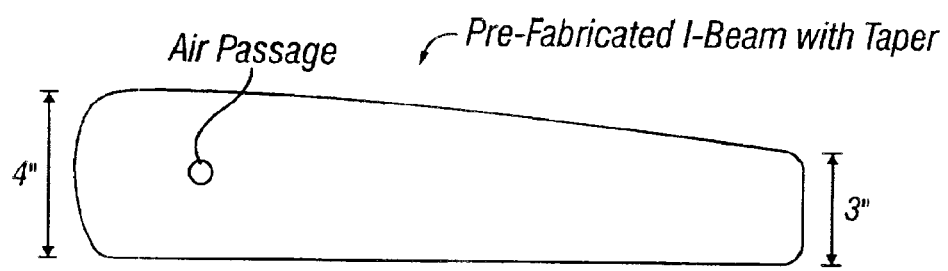
FIG. 11 shows tapered support beams used in the bed of FIG. 9.
Figure 11B:
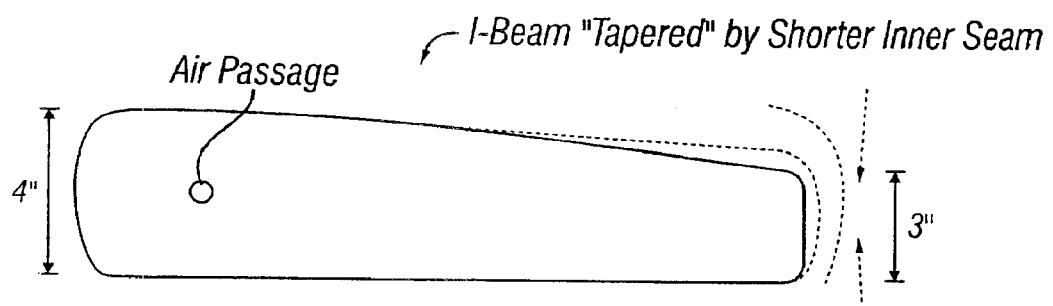

FIG. 10 is an overview of the assembly of FIG. 9 without the removable cover. The tapered support beams generated by inflation of the multiple members are shown in FIG. 11. The beams are prefabricated as integral portions of the inflatable members or by fastening a separately-constructed beam in an airtight seal with the horizontal surfaces of the inflatable member.

Figure 12:
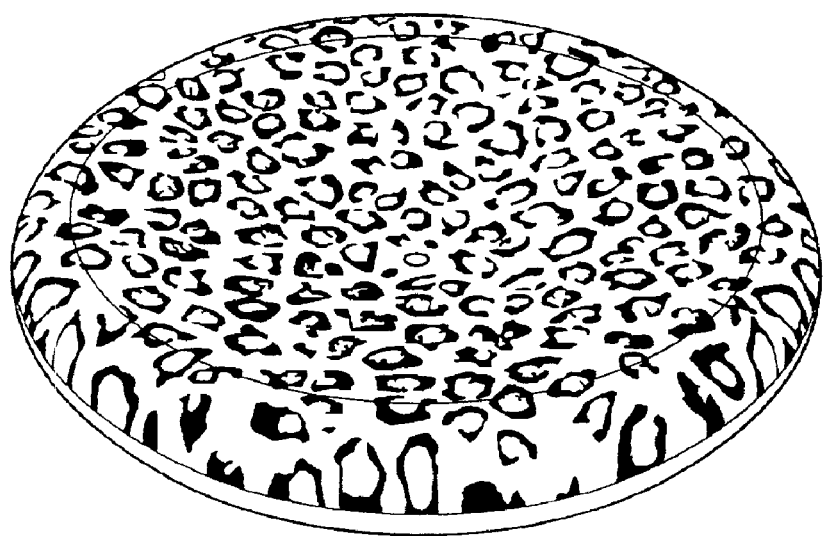
FIG. 12 shows an embodiment with a decorative washable cover.

FIG. 12 shows a completed assembly with the washable cover containing an opening contiguous with the drainage hole. The washable cover can be secured as shown in FIG. 12 by wrapping around the outer member or could be secured using any convenient means, such as Velcro™.

In an additional embodiment, not shown in the figures, the bed will comprise one or more circular or oval shaped inflatable tubes surrounding a hollow center. A covering which surrounds the tubes and the floor of the bed results in a cavity in roughly the center of the bed where the floor is surrounded by the inflated members. Unlike the foregoing designs, where the concavity is created by the weight of the occupant, this alternative arrangement contains a concavity even in the absence of an occupant. The concavity exists because of the difference in levels of the inflated outer members and the floor covering at the center.

Analogously, however, to the foregoing designs, this alternative design can also be constructed using one, two, or a multiplicity of concentric inflatable members, preferably, but not necessarily tapered toward the inner member. In a preferable form of this construction, a single, inflatable circular tube surrounds the floor of the bed, which floor is created by a cover extending under the inflatable member and over the top thereof, and fastened to the floor at the opposite surface.

Further, in this embodiment, the floor may be additionally covered by a foam or other pad fashioned to fit into the cavity at the center.

The inflatable members in all of the embodiments are typically synthesized from materials known in the art such as vinyl, rubber, latex, mylar, and the like. While concentrically arranged tubes and radially spaced members have been illustrated as generating circular beds, oval or rectangular shaped constructions could also be employed; circular beds offer greater ease of construction. The overall shape is arbitrary as long as the essential features of construction are maintained. The immediate fabric covering of the inflatable members, such as those shown in FIGS. 1–10 is constructed of any relatively impermeable material, such as rubber like materials (latex, vinyl, etc.) or rubber, nylon, polyester, rayon, and the like. The materials used in the construction generally, are conventional materials and arbitrarily chosen.

What is claimed is:

1. An inflatable bed having a top and bottom surface designed for animals which comprises a first fabric cover enclosing at least one inflatable member, wherein said cover and said member are arranged so that when inflated and when occupied by an animal, the bed forms a concavity at the center wherein said concavity is created by the weight of the animal, and which bed is detachably covered at least on the top surface with a second, washable, fabric cover, and wherein said bed further comprises at least one support member to provide a flat surface at the bottom surface of the bed.

2. The bed of claim 1, wherein said at least one inflatable member is a single annular, inflatable, tubular member, and said tubular member is enclosed within said first fabric cover.

3. The bed of claim 1, wherein said at least one inflatable member is comprised of rubber.

4. The bed of claim 3, wherein said at least one inflatable member is a rubber inner-tube.

5. The bed of claim 1, where said fabric cover is rubber, latex, vinyl or nylon.

6. The bed of claim 1, wherein said first cover further comprises attached non-skid feet.

7. An inflatable bed designed for animals which comprises a first fabric cover enclosing at least two inflatable members, wherein said members are arranged in an annular manner within said cover so as to generate said concavity at the center at least when occupied by an animal.

8. The bed of claim 7, wherein said inflatable members are, when inflated, circular or oval tubes.

9. The bed of claim 7, which contains a multiplicity of inflatable members, and wherein said members are arranged radially.

10. The bed of claim 9, wherein said members are interconnected to permit passage of air between them.

11. The bed of claim 7, wherein said at least two inflatable members are comprised of rubber.

12. The bed of claim 11, wherein said at least two inflatable members are rubber inner-tubes.

13. The bed of claim 7, where said fabric cover is rubber, latex, vinyl or nylon.

14. The bed of claim 7, which is detachably covered at least on a top surface with a second washable fabric cover.

15. The bed of claim 14, wherein said washable fabric is rubber, latex, vinyl, or nylon.

16. The bed of claim 7, wherein said concavity is created by the weight of the animal.

17. An inflatable bed designed for animals which comprises a first fabric cover enclosing at least one inflatable member, wherein said cover and said member are arranged so that when inflated and at least when occupied by an animal, the bed forms a concavity at the center and wherein said center and only said center contains a drainage hole extending through the body of the bed.

18. The bed of claim 17, wherein said first cover further comprises attached non-skid feet.

19. The bed of claim 17, which contains a single annular, inflatable, tubular member wherein said member is enclosed within said first fabric cover.

20. The bed of claim 17, wherein said at least one inflatable member is comprised of rubber.

21. The bed of claim 17, wherein said at least one inflatable member is a rubber inner-tube.

22. The bed of claim 17, where said fabric cover is rubber, latex, vinyl or nylon.

23. The bed of claim 17, which is detachably covered at least on a top surface with a second washable fabric cover optionally containing an opening contiguous with the drainage hole.

24. The bed of claim 23, wherein said washable fabric is rubber, latex, vinyl, or nylon.

25. An inflatable bed designed for animals which comprises a first fabric cover enclosing at least one inflatable member, wherein said cover and said member are arranged so that when inflated and when occupied by an animal, the bed forms a concavity at the center wherein said concavity is created by the weight of the animal, and which bed is detachably covered at least on a top surface with a second, washable, fabric cover.

26. The bed of claim 25, which contains a single annular, inflatable, tubular member wherein said member is enclosed within said first fabric cover.

27. The bed of claim 25, wherein said at least one inflatable member is comprised of rubber.

28. The bed of claim 27, wherein said at least one inflatable member is a rubber inner-tube.

29. The bed of claim 25, where said fabric cover is rubber, latex, vinyl or nylon.

* * * * *